United States Patent Office 2,967,183
Patented Jan. 3, 1961

2,967,183
FLUORINATED POLYCYCLIC DIETHERS

Robert P. Ruh, Midland, and Robert A. Stowe, Ludington, Mich., assignors to The Dow Chemical Company, Midland, Mich., a corporation of Delaware No Drawing. Filed Mar. 13, 1958, Ser. No. 721,103

2 Claims. (Cl. 260—340.9)

This invention relates to fluorinated polycyclic diethers and is more particularly concerned with specific compounds resulting from, and the reaction of, hexafluorocyclobutene with ethylene glycol.

In U.S. Patent 2,613,228 there is described a reaction of 1,2-dichloro-3,3,4,4-tetrafluorocyclobutene and an acyclic alcohol. This patented reaction involves the condensation of an alcohol with the dichlorotetrafluorocyclobutene to form a mono-substituted ether. One of the specific alcohols that is mentioned is ethylene glycol and from the description it is expected that this ethylene glycol will react, similarly to the other alcohols, with the resultant replacement of a chlorine atom of the aforesaid chlorofluorocyclobutene and the formation of a hydroxyalkyl monoether thereof.

It has now unexpectedly been found that the reaction of hexafluorocyclobutene with ethylene glycol results in the replacement of a fluorine atom and the production of polycyclic materials, at least one of the rings of which is other than a perfluorinated cyclobutene ring. Condensation of the reactants is readily accomplished in the presence of a metallic basic material which will react with and neutralize the acid formed by the reaction, such as an alkali metal hydroxide, e.g. potassium hydroxide, sodium hydroxide, and lithium hydroxide; an alkali metal e.g. sodium, potassium, and lithium; and an alkali metal salt of an alcohol (an alcoholate) e.g. sodium methylate, potassium ethylate, lithium propylate, etc. The reaction is carried out at a temperature from about 0 to 150 degrees centigrade, preferably at the boiling point of the reaction mixture. If higher temperatures than the boiling point of the reaction mixture are employed, pressure vessels are ordinarily used. Normally, the reaction is conducted for a period of time sufficiently long that it is substantially complete under the conditions employed. The end point is conveniently determined by withdrawing periodic samples of the liquid reaction mixture and titrating to determine the alkalinity. When the reaction mixture shows no variation in alkalinity, the reaction is substantially complete. Ordinarily, when conducting the reaction at or near the boiling point of the reaction mixture, reaction times from 2 to 10 hours will usually result in a substantially complete reaction. Separation of the reaction products is readily accomplished by fractional distillation.

The compounds of the present invention are high boiling liquids which are very stable and thereby have utility as heat transfer fluids. They are particularly suitable in those applications where a relatively stable, substantially inert material is needed for the aforesaid purpose. Specifically, the compounds of the present invention are polycyclic fluorine-containing cyclobutenes, that is, materials containing at least 2 cyclic rings, at least 4 fluorine atoms, and at least 2 ring oxygen atoms. While the exact structure has not been proved at the present time, it has been proved that at least 2 rings are present for the compound having the molecular formula $C_6F_4H_4O_2$ and it has also been proved that this compound contains one double bond. The compound does not react with sodium but does decolorize potassium permanganate. A second compound having a molecular weight of 368 and a molecular formula $C_{12}F_8H_8O_4$ contains two double bonds and at least two rings.

The following example is given to illustrate the present invention but is not to be construed as limiting.

Example

Into a 12 liter 3-neck flask equipped with dip tube, thermometer, stirrer, and water-cooled reflux condenser backed by a Dry Ice trap was placed 277 grams of ethylene glycol (4.47 moles) and 3200 milliliters of dry dioxane. To this solution was added with stirring, 620 grams (9.46 moles) of 85 percent potassium hydroxide pellets. The dissolution of potassium hydroxide pellets resulted in a rise in temperature, which was brought back to 27–31 degrees centigrade, the desired reaction temperature. Thereafter, during 6¼ hours at 27–31 degrees centigrade, 1574 grams (9.73 moles) of hexafluorocyclobutene was bubbled in. After adding 55 grams more potassium hydroxide, and gradually allowing the reaction temperature to increase to 45 degrees centigrade, the reaction product was washed with ice water until free of salts and base. The washings were extracted with ether three times and the ether stripped off. The remaining material (mostly dioxane) was added to the dried organic material from the original separation and then distilled at reduced pressure (0.1–0.2 millimeter of mercury absolute) yielding 147 grams (0.8 mole) of a compound having the molecular formula $C_6F_4H_4O_2$, boiling at 121–123 degrees centigrade at 760 millimeters of mercury absolute; a second product, having the molecular formula $C_{12}F_8H_8O_4$, boiling at 148 degrees centigrade at 5 millimeters of mercury absolute, and showing a molecular weight by mass spectroscopy of 368.

While the exact structures of these compounds are not known, the first probably has a structural formula:

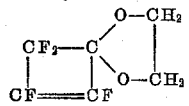

and the second compound probably has the structural formula:

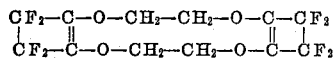

Various modifications may be made in the present invention without departing from the spirit or scope thereof and it is to be understood that we limit ourselves only as defined in the appended claims.

We claim:
1. A polycyclic fluorine-containing organic compound (1) having the molecular formula $C_6F_4H_4O_2$, (2) boiling at 121 to 123 degrees centigrade and (3) prepared by (a) the reaction in the presence of a metallic basic ma- terial and at a temperature between about 0 and 150 degrees centigrade of hexafluorocyclobutene with ethylene glycol, and (b) separating $C_6F_4H_4O_2$ from the reaction mixture.

2. A polycyclic fluorine-containing organic material (1) having the molecular formula $C_{12}F_8H_8O_4$, (2) boiling at 148 degrees centigrade at five millimeters of mercury pressure absolute, and (3) prepared by (a) the reaction, in the presence of a metallic basic material and at a temperature between about 0 and 150 degree centigrade, of hexafluorocyclobutene and ethylene glycol, and (b) separating $C_{12}F_8H_8O_4$ from the reaction mixture.

References Cited in the file of this patent

UNITED STATES PATENTS 2,613,228     Ruh _____ Oct. 7, 1952

OTHER REFERENCES

J. D. Park et al.: J. Am. Chem. Soc., vol. 71 (1949), pp. 2337–2339.

A. L. Henne: J. Indian Chem. Soc., vol. 30 (1953), pp. 809–814.